United States Patent
Bortolini et al.

(10) Patent No.: US 11,306,202 B2
(45) Date of Patent: Apr. 19, 2022

(54) COMPOSITION BASED ON AT LEAST ONE BIODEGRADABLE POLYMER AND USE THEREOF AS A BINDER FOR COATING PRODUCTS

(71) Applicant: BIO-ON S.P.A., San Giorgio di Piano (IT)

(72) Inventors: Olga Bortolini, Ferrara (IT); Alessandro Massi, Ferrara (IT); Dario Cristofaro, Ferrara (IT); Simone Begotti, San Giorgio di Piano (IT)

(73) Assignee: BIO-ON S.P.A., San Giorgio di Piano (IT)

( * ) Notice: Subject to any disclaimer, the term of this patent is extended or adjusted under 35 U.S.C. 154(b) by 0 days.

(21) Appl. No.: 16/762,379

(22) PCT Filed: Nov. 22, 2018

(86) PCT No.: PCT/IB2018/059229
§ 371 (c)(1),
(2) Date: May 7, 2020

(87) PCT Pub. No.: WO2019/102395
PCT Pub. Date: May 31, 2019

(65) Prior Publication Data
US 2020/0277490 A1    Sep. 3, 2020

(30) Foreign Application Priority Data
Nov. 23, 2017    (IT) .................. 102017000134664

(51) Int. Cl.
*C08L 67/04* (2006.01)
(52) U.S. Cl.
CPC .......... *C08L 67/04* (2013.01); *C08L 2201/06* (2013.01); *C08L 2205/02* (2013.01)
(58) Field of Classification Search
CPC .. C08L 67/04; C08L 2201/06; C08L 2205/02; C08J 2367/04; C08J 3/092; C09D 167/04
See application file for complete search history.

(56) References Cited

U.S. PATENT DOCUMENTS

| | | | |
|---|---|---|---|
| 5,395,919 A * | 3/1995 | Lee | C08G 63/06 528/361 |
| 6,024,784 A | 2/2000 | Buisman et al. | |
| 2005/0239998 A1 | 10/2005 | Kinoshita et al. | |
| 2010/0305280 A1 * | 12/2010 | Whitehouse | C09J 167/04 525/450 |

FOREIGN PATENT DOCUMENTS

WO    2004076583 A1    9/2004

OTHER PUBLICATIONS

Sigma Aldrich; Benzene Material Safety Data Sheet, 2012, p. 1-9.*
MG Chemicals; Toluene 9680 Technical Data Sheet, 2017, p. 1-4.*
Niaounakis, M.; Biopolymers: Processing and Products, 2015, p. 80.*
International Search Report dated Mar. 11, 2019 re: Application No. PCT/IB2018/059229, pp. 1-3, citing: WO 2004/076583 A1, U.S. Pat. No. 6,024,784 A and US 2005/0239998 A1.
Written Opinion dated Mar. 11, 2019 re: Application No. PCT/IB2018/059229, pp. 1-5, citing: WO 2004/076583 A1 and U.S. Pat. No. 6,024,784 A.

* cited by examiner

*Primary Examiner* — Robert S Jones, Jr.
(74) *Attorney, Agent, or Firm* — Cantor Colburn LLP

(57) ABSTRACT

A composition including at least one polyhydroxyalkanoate (PHA) having saturated side chains dissolved in at least one aromatic solvent between 50 g/l and 200 g/l and preferably between 80 g/l and 180 g/l. The at least one PHA has a weight-average molecular weight ($M_w$) not greater than 250,000 Da and preferably not greater than 150,000 Da. This composition is particularly suitable as a binder for coating products. The composition can be produced by mixing the PHA with the aromatic organic solvent and heating the mixture at a temperature close to the PHA melting temperature, maintaining the mixture under stirring until complete dissolution of the polymer. Alternatively, the composition can be produced by dissolution of the PHA in a non-aromatic organic solvent having low boiling temperature where the PHA is highly soluble, subsequent addition of the aromatic organic solvent and subsequent removal of the non-aromatic organic solvent by fractional distillation.

10 Claims, No Drawings

COMPOSITION BASED ON AT LEAST ONE BIODEGRADABLE POLYMER AND USE THEREOF AS A BINDER FOR COATING PRODUCTS

TECHNICAL FIELD

The present disclosure relates to a composition based on at least one biodegradable polymer and to the use thereof as binder for coating products.

BACKGROUND

Since the mid-Seventies, on the global market there has been a progressively stronger need to reduce the use of petrochemical polymers (such as polyethylene, polypropylene and most epoxy resins) which have considerable environmental problems due to their disposal and to their dispersion into the environment. For these reasons, in recent decades industries have also focused on biodegradable polymers.

Biodegradable polymers, also known as biopolymers, are polymers that by their nature undergo changes in their chemical structure effected by living organisms such as bacteria, fungi and algae, changes which are catalysed or not by environmental factors such as humidity or solar radiation. According to a generic but not scientifically unexceptionable use of the term "biopolymer", biopolymers can be produced synthetically, such as for example polyethylene terephthalate, and derive from materials of vegetable origin, such as starch, lignin and cellulose. They can also be defined as "biopolymers" not only for their origin but also for their biodegradability properties, and be produced from non-fossil carbon sources by bacteria, such as polylactate and polyhydroxyalkanoates.

Polyhydroxyalkanoates (PHA) are linear polyesters produced from more than 90 different genera of Gram-positive and Gram-negative bacteria (for example *Bacillus, Rhodococcus, Alcaligenes/Ralstonia, Rhizobium, Rhodospirillum, Pseudomonas* and *Azotobacter*). The chemical composition and the average molecular weight of the polyhydroxyalkanoate chains depend, in addition to the type of bacteria from which they are synthesised, also from the culture environment, i.e. the conditions and the type of food provided to the microorganisms. Moreover, the chemical-physical properties (such as melting point and solubility) and mechanical properties of the PHAs can be varied by making mixtures, modifying their surface or combining the PHAs with other polymers (bio and not-bio), inorganic materials or other chemical substrates, allowing a broad variability of application.

Most PHAs have satisfactory stability to UV radiation, a melting point between 160° C. and 180° C. and low water permeation. PHAs are soluble in halogenated solvents such as chloroform, dichloromethane, dichloroethane, and in propylene carbonate, but not in other organic or aqueous solvents.

Poly-β-hydroxybutyrate or poly-3-hydroxybutyrate (P3HB or more simply PHB) is one of the most common polyhydroxyalkanoates, and it is the most used one for the production of bioplastics. The mechanical characteristics of these bioplastics can also be varied on the basis of the solvent-casting technique, mixing with other substances (blending) or by co-polymerisation. The latter can be carried out after the production of PHB (the so called grafting) or it can be carried out by changing the diet of the bacteria that produce PHAs, as in the case of poly(hydroxybutyrate-co-hydroxyvalerate) (PHBHV).

PHB and its co-polymers allow a broad range of applications, including the production of packaging, disposable films, light fibres, or in the biomedical field (for the formation of biodegradable films, capsules and microspheres for drug delivery), through to the field of coating products.

Coating products are, by definition, mixes of chemical products that form a solid film provided with such mechanical and chemical resistance as to protect the support from the aggression of the physical, chemical and biological agents present in the environment and they have characteristics like colour, appearance, texture and uniformity, able to change the aesthetic appearance of the coated article. Coating products can also have covering, transparent, coloured finishing.

The formulation of a coating product always comprises a binder or resin, and a solvent or thinner. There can also be one or more components that are aimed to change colouring (pigments), rheological properties (charges), resistance to degradation and other physical characteristics such as elasticity (plasticisers) and the drying rate (accelerators).

The binder is usually a polymeric base able to form a continuous and adhering film, after drying, to the surface and able to incorporate and bind together all the components of the coating formulation. There are mainly two different types of binders: those soluble in common organic or aqueous solvents, in which the polymer is homogeneously dispersed inside the solvent of the paint, and those in aqueous phase, i.e. the binders finely dispersed or emulsified in the aqueous component.

Coating products have to be customised on the basis of the type of surface, of atmospheric conditions, of chemical or biological exposures, or on the basis of the intended use: automotive industry, construction for interiors and exteriors, mechanical industry, wood industry, nautical industry.

With regard to the marine industry (boats, pipelines, aquaculture equipment, drilling installations) there is an additional distinction depending on whether the coating product is used in the interior, exterior or underwater surfaces.

The coating products used in underwater components have to possess determined characteristics; they have to inhibit metal corrosion, be water repellent, resist abrasion, assure the minimum friction (in the case of ships, so as not to negatively affect speed through the water or fuel consumption) and they have to be antifouling, i.e. prevent surface fouling.

Biofouling is the colonisation of underwater surfaces (wooden and/or metallic) by aquatic macro and micro-organisms that seek rigid substrates to complete their life cycle. To prevent fouling, special paints are used, called antifouling paints or bottom paints. Normally, antifouling paints owe their effectiveness to the presence of biocides, organic, inorganic or biological substances, able to generate one or more active ingredients that are released, over time, on the contact surface of the boat hull to destroy or repel macro and micro-organisms.

Historically, this function was served by organostannic compounds (OTC), in particular by tributyltin (TBT). Since the mid-Eighties, however, there has been a drastic decrease in the use of OTCs (because the release of these compounds in the marine environment leads to high mortality of fish species) until the complete prohibition, in the 2000s, of any product containing them. Other organic compounds containing lead, mercury and arsenic have been tested over the years as TBS substitutes, but they have entailed similar environmental problems. For this reason, in recent years the use of biocides based on zinc and copper oxides has been preferred; copper has especially been preferred because, as an element, it is naturally present in the marine environment. However, copper oxides, far less toxic than OTCs, tend to last for a shorter time, in view of the interaction between metal binders present in the marine environment and copper ions, and the tendency to degrade with solar radiation.

Recently, numerous biocides (both organic and inorganic) have been synthesised, for example Irgarol™ 1051 (2-methylthio-4-tert-butylamino-6-cyclopropyl amine-S-triazine), Diuron™ (3-(3,4-dichlorophenyl)-1,1-dimethylurea), Sea-Nine™ 211 (member of the 3(2H)-isothiazolone family), copper pyrithione and zinc pyrithione. However, all of these compounds are still under scrutiny for their fallout on the marine environment.

On the basis of their composition, i.e. of the binder used in their formulation, antifouling coating products are divided in three major families: soluble matrix, insoluble matrix (also called "hard matrix", or "contact") and self-polishing paints.

Soluble matrix paints have a binder (usually rosin, as such or an esterified form), partially soluble in water, which is degraded over time, releasing the biocide in the surrounding environment. The problem of this kind of paints is the duration, which is a little over one year.

Insoluble matrix antifouling paints are instead based on a polymeric binder with high molecular weight (acrylic resins, vinyl resins or chlorinated rubbers), which is provided with high abrasion resistance and can incorporate a high concentration of biocides which is released over time. Since the binders of this kind of paints are not soluble in sea water, on the outermost layer of the paint an equilibrium is established between the biocide molecules and the water molecules: as the biocide molecules are released, the water molecules take their place. Unfortunately, this release effect becomes progressively weaker at each layer of the paint, reducing the protective effect on the boat. For this reason, antifouling paints of this kind have a duration of approximately 12-24 months, based on the type of marine conditions (such as pH and temperature) and on speed through the water.

Self-polishing antifouling paints (also defined as water-soluble or self-cleaning) are active both at the chemical and at the mechanical level. Coating products of this kind are able to absorb water gradually, leading to a slow, gradual dissolution of the binder (which also in this case is usually an acrylic resin). The chemical action given by water hydrolysis (depending on the pH value of the same) and the mechanical action given by the movement of the boat (depending on cruising speed), lead to the ablation of the paint surface layer, which is replaced by the next one. Self-polishing paints were widely based on organostannic products, and their use has been decreasing with their prohibition.

In recent years, research has been directed at the development of coating products for underwater surfaces devoid of biocides: the antifouling effect in these paints is given by the presence of enzymes on the surface layer or the use of particular organic polymers (generally silicones or fluorinated polymers), or gels, which do not allow the article to be colonised by micro and macro-organisms. In spite of the advantages shown by these paints (longer-lasting action and lower friction), costs are not yet so competitive as to allow their wider marketing.

U.S. Pat. No. 6,024,784 describes the use of PHAs as binders for paints, for water-based or organic-based formulations. Such PHAs are characterised by the presence of mono- or poly-unsaturated side groups, which assure the cross-linking of the polymer during the evaporation of the solvent. The quantity of mono- or poly-unsaturated groups is preferably equal to at least 30%, preferably at least 50%. The resulting coating would be provided with hydrophobic characteristics, gloss, flexibility and adhesion to various substrates. Particularly preferred are the PHAs obtained from mono- or poly-unsaturated fatty acids, such as linseed oil or tall oil.

The Applicant has faced the problem of devising a binder for coating products based on at least one polyhydroxyalkanoate (PHA) having saturated side chains, i.e. without the need to introduce unsaturated side groups such as those described in U.S. Pat. No. 6,024,784, which is dissolved in at least one organic solvent in a quantity suitable for the required use.

SUMMARY

This problem and others that will be better illustrated below were solved by providing a composition comprising at least one PHA having saturated side chains and a weight-average molecular weight ($M_w$) not higher than 250,000 Da, dissolved in at least one aromatic organic solvent in an amount between 50 g/l and 200 g/l.

The Applicant has also found that the dissolution of the PHA in the aromatic organic solvent in the required quantities can be obtained by adding the aromatic organic solvent to the PHA and heating the mixture to a temperature close to the melting temperature of the PHA, maintaining the mixture under stirring until complete dissolution of the polymer.

Alternatively, the composition according to the present disclosure can be prepared by dissolution of the PHA in a non-aromatic organic solvent having low boiling point (lower than 80° C.) wherein the PHA is highly soluble, subsequent addition of the aromatic organic solvent and subsequent removal of the non-aromatic organic solvent by fractional distillation. In this way, the PHA remains in solution in the aromatic solvent without observing any precipitation.

According to a first aspect, the present disclosure therefore relates to a composition comprising at least one polyhydroxyalkanoate (PHA), having saturated side chains and substantially devoid of unsaturated side chains, dissolved in at least one aromatic solvent in an amount of between 50 g/l and 200 g/l, preferably between 80 g/l and 180 g/l, said at least one PHA having a weight-average molecular weight ($M_w$) not greater than 250,000 Da, preferably not greater than 150,000 Da, determined by GPC (Gel Permeation Chromatography) analysis.

According to another aspect, the present disclosure relates to a process for the production of a composition as defined above that comprises:

adding at least one aromatic organic solvent to said at least one PHA and heating to a temperature of between ($T_m$−30° C.) and ($T_m$+20° C.), preferably between ($T_m$−20° C.) and $T_m$, wherein $T_m$ is the melting temperature of the PHA;

maintaining the mixture thus obtained under stirring at said temperature for a time sufficient to obtain a complete dissolution of the PHA.

According to an additional aspect, the present disclosure relates to a process for the production of a composition as defined above which comprises:

dissolving said at least one PHA in at least one non-aromatic organic solvent having a boiling temperature lower than 80° C., so as to obtain a first PHA solution;

adding at least one aromatic organic solvent to said first PHA solution;

after mixing, removing said at least one non-aromatic organic solvent by selective distillation.

According to an additional aspect, the present disclosure relates to the use of a composition as defined above as binder for coating products.

Within the present description and the appended claims, every numerical range includes the extremes of that range and any value within the same, even if it is not expressly identified.

DETAILED DESCRIPTION OF THE DISCLOSURE

With regard to polyhydroxyalkanoates (PHA), they are polymers produced by micro-organisms isolated from natural environments or also by genetically modified microorganisms, which serve as carbon and energy reserve and which are accumulated by various species of bacteria in unfavourable growth conditions and in the presence of a source of excess carbon. PHAs are synthesised and accumulated by approximately 300 different microbial species, included in more than 90 genera of Gram-positive and Gram-negative bacteria, for example *Bacillus, Rhodococcus, Rhodospirillum, Pseudomonas, Alcaligenes, Azotobacter, Rhizobium*. In the cells, the PHA are stored in the form of microgranules, whose dimension and number per cell varies in the different bacterial species.

The PHAs usable according to the present disclosure have saturated side chains, i.e. they are substantially devoid of unsaturated side chains. They are preferably formed by repetitive units having the following formula:

—O—CHR$_1$—(CH$_2$)$_n$—CO—     (I)

wherein:

R$_1$ is selected from: C$_1$-C$_{12}$ alkyls, C$_4$-C$_{16}$ cycloalkyls;

n is an integer of from 1 to 6, preferably is 1 or 2.

Preferably, R$_1$ is methyl or ethyl, and n is 1 or 2.

PHAs can be both homopolymers and copolymers or terpolymers. In the case of copolymers or terpolymers, they can consist of different repetitive units of formula (I), or of at least one repetitive unit of formula (I) in combination with at least one repetitive unit deriving from comonomers that are able to copolymerise with hydroxyalkanoates, for example lactones or lactams. In this latter case, the repetitive units of formula (I) are generally present in an amount equal to at least 10% in moles relative to the total moles of repetitive units.

Particularly preferred repetitive units of formula (I) are those deriving from: 3-hydroxybutyrate, 3-hydroxyvalerate, 3-hydroxyhexanoate, 3-hydroxyoctanoate, 3-hydroxyundec-10-enoate, 4-hydroxyvalerate.

PHAs can be divided in three groups, according to the number of carbon atoms that constitute the monomeric unit: PHAscl (short chain length) consist of monomeric units having 3 to 5 carbon atoms, PHAmcl (medium chain length) consist of monomeric units having 6 to 15 carbon atoms, while PHAlcl (long chain length) consist of monomeric units having more than 15 carbon atoms. PHAscl have a high degree of crystallinity, while PHAmcl and PHAlcl are elastomers with low crystallinity and have low melting point.

Particularly preferred PHAs are: poly-3-hydroxybutyrate (PHB), poly-3-hydroxyvalerate (PHV), poly-3-hydroxyhexanoate (PHH), poly-3-hydroxyoctanoate (PHO), poly(3-hydroxybutyrate-co-3-hydroxyvalerate) (PHBV), poly(3-hydroxybutyrate-co-3-hydroxyhexanoate) (PHBH), poly(3-hydroxybutyrate-co-4-hydroxybutyrate), poly(3-hydroxyoctanoate-co-3-hydroxyundecen-10-enoate) (PHOU), poly(3-hydroxybutyrate-co-3-hydroxyvalerate-co-4-hydroxyvalerate) (PHBVV), or mixtures thereof.

With regard to the production of the PHAs, it is carried out preferably by microbial fermentation of an organic substrate (for example carbohydrates or other fermentable substrates, such as glycerol) by means of a strain of microorganisms able to produce PHA, and subsequent recovery of the PHAs from the cell mass. For additional details, reference is made for example to patent applications WO 99/23146, WO 2011/045625 and WO 2015/015315. Substrates suitable for the production of PHAs by fermentation can be obtained in particular from processing vegetables, for example juices, molasses, pulps deriving from the processing of sugar beets, sugar cane. These substrates contain in general, in addition to saccharose and other carbohydrates, organic growth factors, nitrogen, phosphorus and/or other minerals useful as nutrients for cell growth. An alternative is constituted by glycerol, a source of organic carbon with low cost, being a by-product of the production of biodiesel (see for example U.S. Pat. No. 8,956,835 B2).

The PHAs obtained from bacterial fermentation have high weight-average molecular weight ($M_w$), which generally varies between 500,000 and 2,000,000 Da. For the purposes of the present disclosure, the molecular weight of the PHAs is reduced until obtaining a weight-average molecular weight ($M_w$) not higher than 250,000 Da, preferably not higher than 150,000 Da. The value of $M_w$ is preferably not lower than 25,000 Da, more preferably not lower than 50,000 Da. For this purpose, the PHA can be subjected to controlled depolymerisation according to known techniques, which in general comprise hydrolysis of the polymer in controlled conditions, by addition of a strong acid (for example HCl or $H_2SO_4$) to a solution of the PHA in an organic solvent, for example chloroform, to obtain a biphasic system that is maintained under reflux so as to obtain the desired depolymerisation degree.

The weight-average molecular weight can be determined by known techniques, in particular by GPC (Gel Permeation Chromatography) analysis. The GPC analysis can be carried out according to known techniques, for example using as solvent chloroform added with toluene (toluene concentration: approximately 1 µl/10 ml) and calibrating the instrument with monodispersed polystyrene standards with molecular weights from 2,000 to 800,000 Dalton.

With regard to the aromatic organic solvent, this generally has a boiling point not lower than 100° C., preferably between 105° C. and 160° C., and it can be selected for example from: toluene, meta-xylene, ortho-xylene, para-xylene, ethylbenzene, or mixtures thereof. These are solvents suitable for the formulation of coating products, in which the PHAs are poorly soluble according to conventional processes. The obtainment of solutions of PHAs in said solvents at high concentrations (between 50 g/l and 200 g/l, preferably between 80 g/l and 180 g/l) allows their use as binders for coating products, for example paints, enamels or lacquers, characterised by a high degree of biodegradability, accompanied by a high covering effect of the painting product, and high adhesion to various substrates (such as plastic, metal, wood, paper, etc.) For the formulation of coating products, to the composition according to the present disclosure other conventional components can be added, such as for example: pigments, fillers, drying accelerators, plasticisers, antioxidants, viscosity modifying agents, rheology modifying agents, stabilising agents, anti-sedimentation agents, antifouling agents, biocides, etc.

The compositions according to the present disclosure are generally in the form of liquid solutions, or also in gel form, depending on temperature, concentration and characteristics of the PHA.

As indicated above, the composition according to the present disclosure can be prepared according to two alternative processes.

According to the first process, the aromatic organic solvent is added to the PHA and heated to a temperature of between ($T_m$–30° C.) and ($T_m$+20° C.), preferably between ($T_m$–20° C.) and $T_m$, wherein $T_m$ is the melting temperature of the PHA. The mixture is maintained at said temperature under stirring until complete dissolution of the polymer. The Applicant has observed that heating to a temperature around the melting temperature of the PHA allows to obtain a complete dissolution of the polymer in the aromatic solvent, without observing any precipitation thereof when the solution is cooled to ambient temperature. The melting temperature of the PHA can vary according to the type of PHA considered, and in particular to its molecular weight, and according to the length of the side chains. For example a poly-3-hydroxybutyrate (PHB) generally has a melting temperature equal to approximately 170-180° C., while a poly (3-hydroxybutyrate-co-3-hydroxyvalerate-co-4-hydroxyvalerate) (PHBVV) generally has a melting temperature equal to approximately 160-170° C.

With regard to the second process, the PHA is firstly dissolved in a non-aromatic organic solvent having boiling temperature lower than 80° C., preferably between 40° C. and 70° C., so as to subsequently allow its removal by fractional distillation (stripping), because the aromatic organic solvent into which the PHA is subsequently dissolved has a substantially higher boiling temperature. The non-aromatic organic solvent can be selected from the solvents in which the PHA has high solubility, such as chlorinated solvents, for example chloroform, dichloromethane, dichloroethane, or mixtures thereof.

Once the dissolution of the PHA in the non-aromatic organic solvent is obtained, the aromatic organic solvent is added to the solution and the solution is accurately mixed. Then, the non-aromatic organic solvent is removed by fractional distillation.

In this way a solution of the PHA in the aromatic solvent is obtained that is stable over time even at relatively high concentrations of the PHA (from 50 g/l to 200 g/l, preferably from 80 g/l to 180 g/l).

The following working examples are provided merely to illustrate the present disclosure and should not be construed in a sense that would limit the scope of protection defined by the appended claims.

EXAMPLE 1

Controlled Depolymerisation of the PHB (Biphasic, Acid Conditions: HCl 6M)

In a 250 ml flask, equipped with a magnetic stirrer and a reflux condenser, 2 g of PHB (homopolymer) suspended in 50 ml of chloroform ($CHCl_3$) were placed. The mixture was then maintained under stirring for 5 minutes, to allow the dissolution of a part of the polymer and facilitate the subsequent reaction. 50 ml of an aqueous HCl solution (6M) were slowly added and the system was brought to reflux for 24 hours. From the final solution an aqueous phase and an organic phase were then separated by means of a separating funnel. The aqueous phase was washed with chloroform aliquots (50 ml each) to extract the PHB residues. The organic phases were then brought together and, after anhydrification with $Na_2SO_4$, concentrated at reduced pressure.

Final product net weight: 1.8 grams.

Weight-average molecular weight (GPC): Mw 100,000 Da approximately.

The GPC analysis was carried out with a chromatographic system (comprising degasser, isocratic pump, column compartment, UV detector, RID detector), using columns able to separate molecules having molecular weight up to 1,000,000, preceded by an in-line filter having porosity equal to 0.2 µm. The sample was dissolved in $CHCl_3$ added with toluene (toluene concentration: approximately 1 µl/10 ml). The calibration of the instrument was carried out with monodispersed polystyrene standards with molecular weights from 2,000 to 800,000 Dalton. Other analysis conditions:

flow: 0.2÷0.4 ml/min temperature of column compartment and detector: 30° C.-50° C.

analysis volume: 20 µl analysis time: 30÷45 min.

Purification of the PHB 0.5 g of the PHB obtained as illustrated above (Mw=approximately 100,000 Da) were placed inside a 100 ml flask together with a magnetic stirrer and dissolved in 30 ml of chloroform ($CHCl_3$) at a temperature of 60° C., with a speed of 800 rpm. In parallel, 80 ml of methanol ($CH_3OH$) were poured in a 250 ml flask inserted inside an ice bath. The chloroform solution was slowly dripped inside the methanol solution to cause precipitation of the PHB. Once the addition was completed, the system was maintained at 0° C. for 20 minutes before being filtered. The filtrate was discarded, while the solid residue was washed, directly on the filter, with two aliquots of 25 ml of methanol. The solid was then dried under vacuum. Final product net weight: 0.486 grams.

Dissolution of the PHB in Xylene (100 g/l) (First Process)

1 g of PHB ($M_w$=approximately 100,000 Da) obtained as described above was inserted in a 50 ml flask in which a magnetic stirrer was present with 10 ml of xylene (mixture of isomers, VWR Chemicals, CAS Number: 1330-20-7).

The flask was connected to a reflux apparatus and it was inserted inside an oil bath regulated by an external thermostat.

The system was then brought to the temperature of 140° C. (PHB melting temperature equal to approximately 170-180° C.) and left under agitation at 1000 RPM for one hour (the PHB started to dissolve in xylene at around 125-130° C.). The solution was then cooled to ambient temperature without observing any precipitation of the PHB.

EXAMPLE 2

Dissolution of PHB-VV in Xylene (150 g/l) (First Process)

1.5 g of PHB-VV (Mw=approximately 100,000 Da) were inserted in a 50 ml flask in which a magnetic stirrer was present with 10 ml of xylene (mixture of isomers, VWR Chemicals, CAS Number: 1330-20-7). The flask was connected to a reflux apparatus and it was inserted inside an oil bath regulated by an external thermostat.

The system was then brought to the temperature of 140° C. (PHB-VV melting temperature equal to approximately 160-170° C.) and maintained under stirring at 1000 RPM for one hour (the PHB-VV started to dissolve in xylene at around 105-110° C.). The solution was then cooled to ambient temperature without observing any precipitation of the PHB-VV.

EXAMPLE 3

Dissolution of PHB in Xylene Using Chloroform (100 g/l) (Second Process)

1 g of PHB (Mw=approximately 100,000 Da) obtained as described in Example 1, was inserted in a flask in which a magnetic stirrer was present with 10 ml of chloroform (VWR Chemicals, CAS Number: 67-66-3, containing amylene (50 ppm) as a stabiliser). The flask was connected to a reflux apparatus and it was inserted inside an oil bath regulated by an external thermostat. The system was then brought to the temperature of 40° C. and maintained under stirring at 1000 RPM for one hour. The flask was subsequently removed from the oil bath and added, slowly, with 10 ml of xylene (mixture of isomers, VWR Chemicals, CAS Number: 1330-20-7). The flask was again inserted into the oil bath. The system was then brought to the temperature of 60° C. and kept under stirring at 1000 RPM for one hour. The flask was subsequently removed from the oil bath and connected to a rotating evaporator that served as distillation unit. The temperature was regulated to 70° C. (without applying the vacuum) to selectively distil most of the chloroform. Subsequently, the pressure was reduced (approximately 2 mbar) for the time necessary to remove the chloroform completely, as verified with $^{13}$C NMR of the solution. The solution was then cooled to ambient temperature without observing any precipitation of the PHB.

EXAMPLE 4

Dissolution of PHB-VV in Xylene Using Chloroform (150 g/l) (Second Process)

1.5 grams of PHB-VV (Mw=approximately 100,000 Da) were inserted in a flask in which a magnetic stirrer was present with 10 ml of chloroform (VWR Chemicals, CAS Number: 67-66-3, containing amylene (50 ppm) as a stabiliser). The flask was connected to a reflux apparatus and it was inserted inside an oil bath regulated by an external thermostat. The system was then brought to the temperature of 40° C. and maintained under agitation at 1000 RPM for one hour. The flask was subsequently removed from the oil bath and added, slowly, with 10 ml of xylene (mixture of isomers, VWR Chemicals, CAS Number: 1330-20-7). The flask was again inserted into the oil bath. The system was then brought to the temperature of 60° C. and kept under stirring at 1000 RPM for one hour. The flask was subsequently removed from the oil bath and connected to a rotating evaporator that served as distillation unit. The temperature was regulated to 70° C. (without applying the vacuum) to selectively distil most of the chloroform. Subsequently, the pressure was reduced (approximately 2 mbar) for the time necessary to remove the chloroform completely, as verified with $^{13}$C NMR of the solution. The solution was then cooled to ambient temperature without observing any precipitation of the PHB-VV.

The invention claimed is:

1. A process for producing a composition comprising at least one polyhydroxyalkanoate (PHA), having saturated side chains and substantially devoid of unsaturated side chains, dissolved in at least one aromatic solvent in an amount of between 50 g/l and 200 g/l, said at least one PHA having a weight-average molecular weight ($M_w$) not greater than 250,000 Da, determined by GPC (Gel Permeation Chromatography) analysis, the process comprising:

dissolving the at least one PHA in at least one non-aromatic organic solvent having a boiling temperature lower than 80° C., so as to obtain a first PHA solution;

adding the at least one aromatic organic solvent to said first PHA solution;

after mixing, removing said at least one non-aromatic organic solvent by selective distillation.

2. The process according to claim 1, wherein said at least one non-aromatic organic solvent is a chlorinated solvent.

3. The process according to claim 1, wherein said at least one PHA is formed by repetitive units of formula:

$$—O—CHR_1—(CH_2)_n—CO— \quad (I)$$

wherein:

$R_1$ is selected from: $C_1$-$C_{12}$ alkyls, $C_4$-$C_{16}$ cycloalkyls;

n is an integer of from 1 to 6.

4. The process according to claim 2, wherein said at least one PHA is selected from: poly-3-hydroxybutyrate (PHB), poly-3-hydroxyvalerate (PHV), poly-3-hydroxyhexanoate (PHH), poly-3-hydroxyoctanoate (PHO), poly(3-hydroxybutyrate-co-3-hydroxyvalerate) (PHBV), poly(3-hydroxybutyrate-co-3-hydroxyhexanoate) (PHBH), poly (3-hydroxybutyrate-co-4-hydroxybutyrate), poly (3-hydroxyoctanoate-co-3-hydroxyundecen-10-enoate) (PHOU), poly(3-hydroxybutyrate-co-3-hydroxyvalerate-co-4-hydroxyvalerate) (PHBVV), or mixtures thereof.

5. The process according to claim 1, wherein said at least one PHA has a weight-average molecular weight ($M_w$) not higher than 150,000 Da.

6. The process according to claim 1, wherein said at least one PHA has a weight-average molecular weight ($M_w$) not lower than 25,000 Da.

7. The process according to claim 1, wherein said at least one aromatic organic solvent has a boiling temperature not lower than 100° C.

8. The process according to claim 1, wherein said at least one aromatic organic solvent is selected from: toluene, meta-xylene, ortho-xylene, para-xylene, ethylbenzene, or mixtures thereof.

9. The process according to claim 1, wherein said at least one non-aromatic organic solvent has a boiling temperature between 40° C. and 70° C.

10. The process according to claim 2, wherein said at least one non-aromatic organic solvent is selected from: chloroform, dichloromethane, dichloroethane, or mixtures thereof.

\* \* \* \* \*